US010805249B1

(12) United States Patent
Dalonzo

(10) Patent No.: US 10,805,249 B1
(45) Date of Patent: Oct. 13, 2020

(54) SYSTEMS AND METHODS FOR SHARING CONTENT

(71) Applicant: Facebook, Inc., Menlo Park, CA (US)

(72) Inventor: Christian Xavier Dalonzo, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 48 days.

(21) Appl. No.: 15/995,791

(22) Filed: Jun. 1, 2018

(51) Int. Cl.
*H04L 12/58* (2006.01)

(52) U.S. Cl.
CPC ............ *H04L 51/10* (2013.01); *H04L 51/066* (2013.01); *H04L 51/16* (2013.01); *H04L 51/18* (2013.01)

(58) Field of Classification Search
None
See application file for complete search history.

(56) References Cited

U.S. PATENT DOCUMENTS

| 2004/0075701 A1* | 4/2004 | Ng | G06Q 30/02 |
| | | | 715/867 |
| 2013/0083906 A1* | 4/2013 | Roberts | H04N 7/147 |
| | | | 379/88.13 |
| 2013/0235045 A1* | 9/2013 | Corazza | G06T 13/40 |
| | | | 345/473 |
| 2015/0088784 A1* | 3/2015 | Dhara | G06N 5/02 |
| | | | 706/11 |
| 2017/0359290 A1* | 12/2017 | Hsu | H04L 51/16 |
| 2018/0077096 A1* | 3/2018 | DeMattei | H04L 51/10 |

* cited by examiner

*Primary Examiner* — Tapas Mazumder
(74) *Attorney, Agent, or Firm* — Sheppard Mullin Richter & Hampton LLP

(57) ABSTRACT

Systems, methods, and non-transitory computer-readable media can determine at least one message to be sent through a message thread, wherein the message thread is used to exchange messages among users. At least one visual augmentation to be applied to the at least one message can be determined. The at least one visual augmentation can be applied to the at least one message. The at least one visually augmented message is sent through the message thread.

17 Claims, 10 Drawing Sheets

500

Determine at least one message to be sent through a message thread, wherein the message thread is used to exchange messages among users
502

Determine at least one visual augmentation to be applied to the at least one message
504

Apply the at least one visual augmentation to the at least one message, wherein the at least one visually augmented message is sent through the message thread
506

FIGURE 5

SYSTEMS AND METHODS FOR SHARING CONTENT

FIELD OF THE INVENTION

The present technology relates to the field of content sharing. More particularly, the present technology relates to techniques for sharing content with users.

BACKGROUND

Users often utilize computing devices for a wide variety of purposes. Users can use their computing devices to, for example, interact with one another, access media content, share media content, and create media content. In some cases, media content can be provided by members of a social network. The media content can include one or a combination of text, images, videos, and audio. The media content may be published to the social network for consumption by others.

SUMMARY

Various embodiments of the present disclosure can include systems, methods, and non-transitory computer readable media configured to determine at least one message to be sent through a message thread, wherein the message thread is used to exchange messages among users. At least one visual augmentation to be applied to the at least one message can be determined. The at least one visual augmentation can be applied to the at least one message. The at least one visually augmented message is sent through the message thread.

In some embodiments, the at least one visual augmentation modifies a color of a message bubble in which the message appears.

In some embodiments, the at least one visual augmentation modifies a font used to format the message.

In some embodiments, the at least one visual augmentation modifies an appearance of the at least one message using one or more graphical overlays.

In some embodiments, the at least one visual augmentation modifies an appearance of the at least one message using one or more graphical animations.

In some embodiments, the systems, methods, and non-transitory computer readable media are configured to determine that the at least one message satisfies predefined criteria for applying the at least one visual augmentation.

In some embodiments, the at least one visual augmentation is automatically applied to the at least one message when the predefined criteria is satisfied.

In some embodiments, the at least one visual augmentation is provided as a suggested visual augmentation for the at least one message when the predefined criteria is satisfied.

In some embodiments, the predefined criteria is satisfied when the at least one message includes one or more predefined terms and/or phrases.

In some embodiments, the at least one visually augmented message is sent through a social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method, according to an embodiment of the present disclosure.

Figure 1:
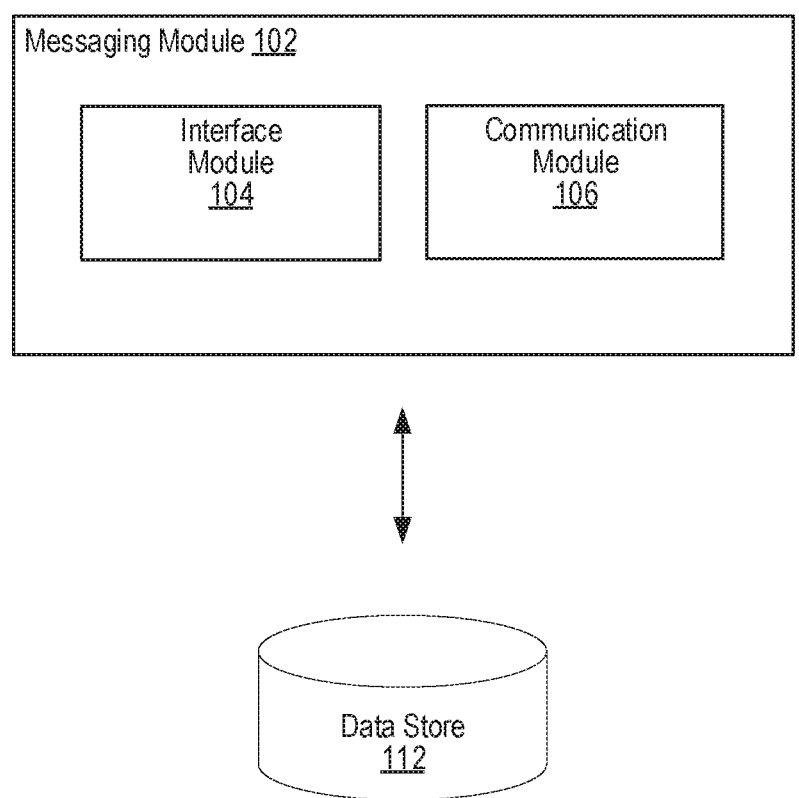
FIG. 1 illustrates an example system including an example messaging module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches For Sharing Content

As mentioned, users often utilize computing devices for a wide variety of purposes. Users can use their computing devices to, for example, interact with one another, access media content, share media content, and create media content. In some cases, media content items can include postings from members of an online community or platform, such as a social networking system. The postings may include one or a combination of text, images, videos, and audio. The postings may be published to the social networking system for consumption by others. In some instances, users can create and send content as messages through the social networking system, for example, using a messaging software application.

Under conventional approaches, users can confront various challenges when exchanging messages (e.g., content) with other users through a social networking system. In general, messages exchanged over the social networking system are accessible through a messaging interface. A message can include text and/or media content items (e.g., images, videos, etc.). Further, text included in messages is typically uniform in format. For example, messages are typically formatted so that the same font and the same font size are applied to all text included in those messages. Such limitations can prevent users from distinguishing certain messages over others. Accordingly, the user experience can suffer, thereby discouraging users from sharing content through the social networking system.

An improved approach rooted in computer technology overcomes the foregoing and other disadvantages associated with conventional approaches specifically arising in the realm of computer technology. In various embodiments, users of a messaging application can send and receive messages through the social networking system. In some embodiments, the messaging application can provide options for selectively enhancing the presentation of certain messages over other messages in a given message thread. For example, in some embodiments, a message can be visually augmented by modifying a color of its corresponding message bubble. In another example, in some embodiments, the message can be visually augmented by modifying a font used to format text included in the message. In yet another example, in some embodiments, the message can be visually augmented by animating aspects of the message. In some embodiments, messages to be visually augmented can automatically be identified and augmented. For example, a message that includes a certain term or phrase can automatically be identified and visually augmented. More details relating to the disclosed technology are provided below.

FIG. 1 illustrates an example system 100 including an example messaging module 102, according to an embodiment of the present disclosure. As shown in the example of FIG. 1, the messaging module 102 can include an interface module 104 and a communication module 106. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the messaging module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the messaging module 102 or at least a portion thereof can be implemented using one or more computing devices or systems that include one or more servers, such as network servers or cloud servers. In some instances, the messaging module 102 can, in part or in whole, be implemented within or configured to operate in conjunction with a social networking system (or service), such as the social networking system 630 of FIG. 6. In some instances, the messaging module 102 can be, in part or in whole, implemented within or configured to operate in conjunction or be integrated with a client computing device, such as the user device 610 of FIG. 6. For example, the messaging module 102 can be implemented as or within a dedicated application (e.g., app), a program, or an applet running on a user computing device or client computing system. The application incorporating or implementing instructions for performing some, or all, functionality of the messaging module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The messaging module 102 can be configured to communicate and/or operate with the at least one data store 112, as shown in the example system 100. The at least one data store 112 can be configured to store and maintain various types of data. For example, the data store 112 can store information describing various content that has been shared by users of a social networking system. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

In various embodiments, the interface module 104 can be configured to provide a messaging interface through which users can send messages and access received messages. For example, the messaging interface may be presented through a display screen of a computing device. A user operating the computing device can interact with the messaging interface using various touchscreen gestures, for example. More details regarding the messaging interface will be provided below with reference to FIGS. 4A-4D.

In some embodiments, the communication module 106 can provide various options for creating and sending messages through the social networking system. In some embodiments, a message thread for a group of users (e.g., a user and one or more other users) can be created, for example, when an initial message is communicated among users in the group. The message thread can then be used to manage on-going communication between the users in the group. The membership of such message threads can vary over time, for example, as new users are added to the group or when existing users leave (or are removed from) the group. More details regarding the communication module 106 will be provided below with reference to FIG. 2.

Figure 2:
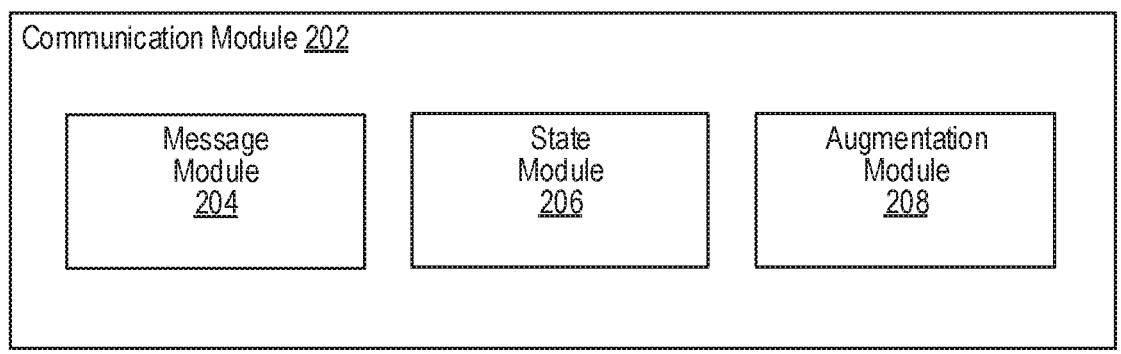
FIG. 2 illustrates an example communication module, according to an embodiment of the present disclosure.

FIG. 2 illustrates an example communication module 202, according to an embodiment of the present disclosure. In some embodiments, the communication module 106 of FIG. 1 can be implemented with the communication module 202. As shown in the example of FIG. 2, the communication module 202 can include a message module 204, a state module 206, and an augmentation module 208.

The message module 204 can be used to compose messages. In some embodiments, the message module 204 can provide options for sending and accessing messages. For example, a user can select an option to compose a message. In various embodiments, messages can include text and/or visual content (e.g., images, videos, graphical text, animated text, etc., and combinations thereof). After composing the message, the user can provide names (or usernames) of one or more recipients of the message and can select an option to send the message. Once the message is sent, the message module 204 can create a message thread that manages messages exchanged between the user and the one or more recipients. If a message thread between the user and the recipients already exists, then the message module 204 can send the message through the existing message thread.

In some embodiments, messages exchanged between users can be assigned respective send states. For example, in some embodiments, a message sent through the social networking system is assigned a timestamp indicating when the message was sent. This timestamp can be shown in a corresponding message thread through which the message was communicated, for example. In some embodiments, the state module 206 can assign a corresponding state to the sent message. In such embodiments, the sent message may be assigned a "delivered" state when the message has been delivered to its recipients or an "opened" (or "read") state when the message has been accessed (or viewed) by an intended recipient or a threshold number of the recipients (e.g., one recipient, all recipients, etc.).

The augmentation module 208 can provide options for visually augmenting the appearance of messages. For example, a message can be augmented visually to distinguish the message over other messages exchanged within a given message thread. More details regarding the augmentation module 208 will be provided below with reference to FIG. 3.

Figure 3:
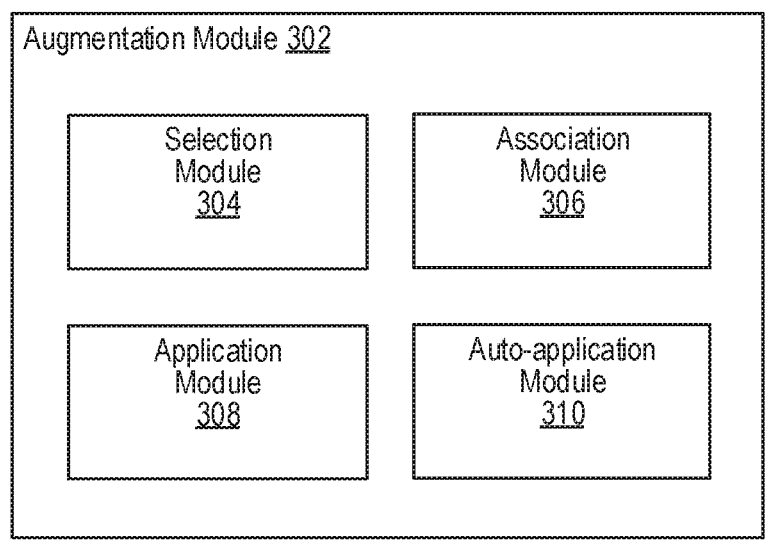
FIG. 3 illustrates an example augmentation module, according to an embodiment of the present disclosure.

FIG. 3 illustrates an example augmentation module 302, according to an embodiment of the present disclosure. In some embodiments, the augmentation module 208 of FIG. 2 can be implemented with the augmentation module 302. As shown in the example of FIG. 3, the augmentation module 302 can include selection module 304, an association module 306, an application module 308, and an auto-application module 310.

The selection module 304 can provide options for visually augmenting messages. For example, in some embodiments, the selection module 304 can provide options for visually augmenting a message when the message is being composed. These options can be provided, for example, through an application (e.g., a web browser, a social networking application, a messaging application, etc.) running on a computing device being operated by a user. In such embodiments, the selection module 304 can provide options that correspond to different visual augmentations that can be applied to the message. The user can select one or more of the visual augmentations to be applied to the message. Once selected, the association module 306 can associate the one or more selected visual augmentations with the message. The message can then be sent to one or more recipients through a given message thread. In various embodiments, the application module 308 can apply the visual augmentations associated with the message when the message is presented in the message thread. As a result, users that are members of the message thread are shown a visually augmented version of the message.

In general, visual augmentations can be used to distinguish (or enhance the presentation of) certain messages over other messages exchanged through a given message thread. In some embodiments, a message can be visually augmented by modifying its corresponding message bubble. For example, one or more colors associated with the message bubble can be modified to distinguish the message from other messages. In some embodiments, a message can be visually augmented by modifying a font and/or font size used to format text in the message. For example, rather than relying on a standard font scheme that applies a predefined font (or font size) to all messages, text included in a visually augmented message can be formatted using a different font and/or font size. In some embodiments, a message can be augmented visually using one or more graphical overlays (e.g., images). For example, a graphical overlay that includes visual representations of balloons can be overlaid on top of the message. In some embodiments, a message can be augmented visually by animating aspects of the message. For example, a hearts animation can be applied to a given message. In this example, the animation can be played when the message is initially shown in a message thread. In some embodiments, members of the message thread can select an option to reanimate such animations, for example, by performing a touchscreen gesture (e.g., tap gesture) on the message.

In some embodiments, visual augmentations can automatically be applied to messages. For example, the auto-application module 310 can determine when a message satisfies predefined criteria for applying one or more visual augmentations. In some embodiments, once the criteria is satisfied, the auto-application module 310 can automatically apply the one or more visual augmentations to the message. In some embodiments, criteria for automatically applying a visual augmentation may be satisfied when a message includes a predefined term and/or phrase. For example, in some embodiments, the auto-application module 310 can determine whether a message to be sent includes any predefined terms and/or phrases. If the message includes a predefined term and/or phrase, the auto-application module 310 can determine any visual augmentations that are associated with the predefined term and/or phrase, and can automatically apply those visual augmentations to the message. In some embodiments, rather than automatically applying the visual augmentations, the auto-application module 310 can provide the visual augmentations as suggested augmentations for the message. A user composing the message can then select a suggested augmentation to be applied to the message.

Figure 4A:
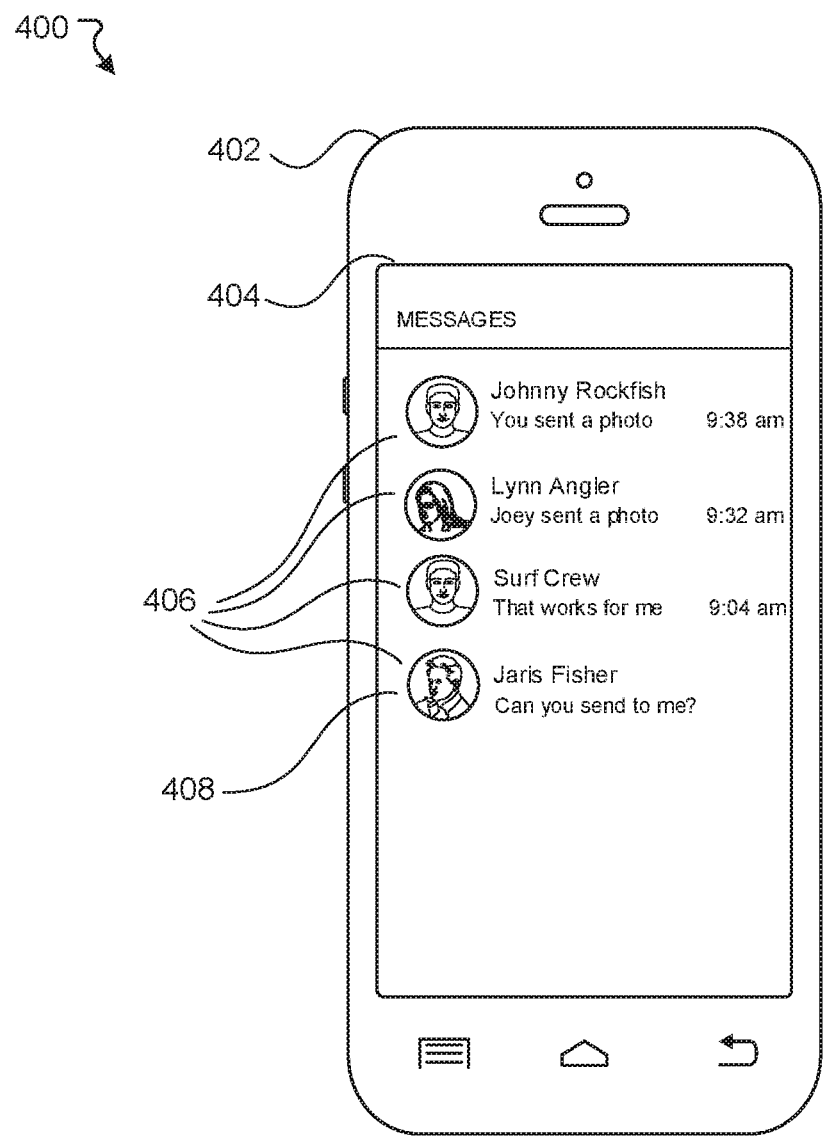
FIGS. 4A-4D illustrate example interfaces, according to an embodiment of the present disclosure.

FIG. 4A illustrates an example 400 of a messaging interface 404, according to an embodiment of the present disclosure. In this example, the messaging interface 404 is presented through a display screen of a computing device 402 that is configured to interact with a social networking system. Further, the messaging interface 404 may be provided through an application (e.g., a web browser, a social networking application, a messaging application, etc.) running on the computing device 402.

Figure 4B:
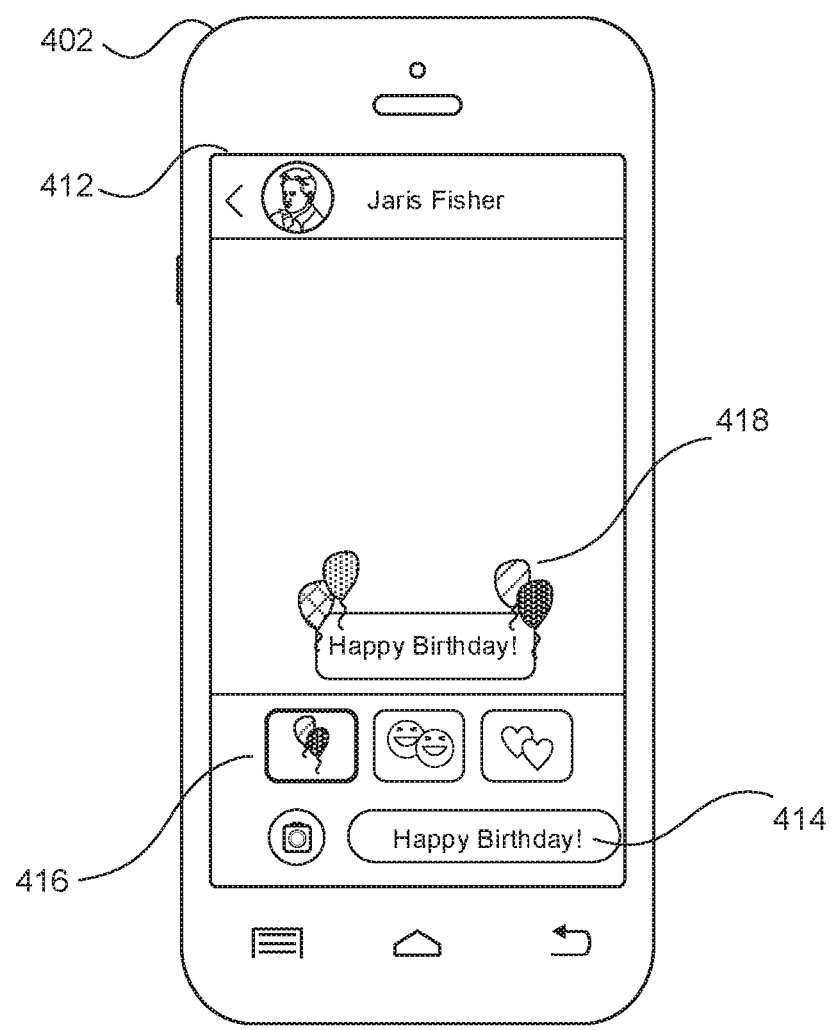
Figure 4C:
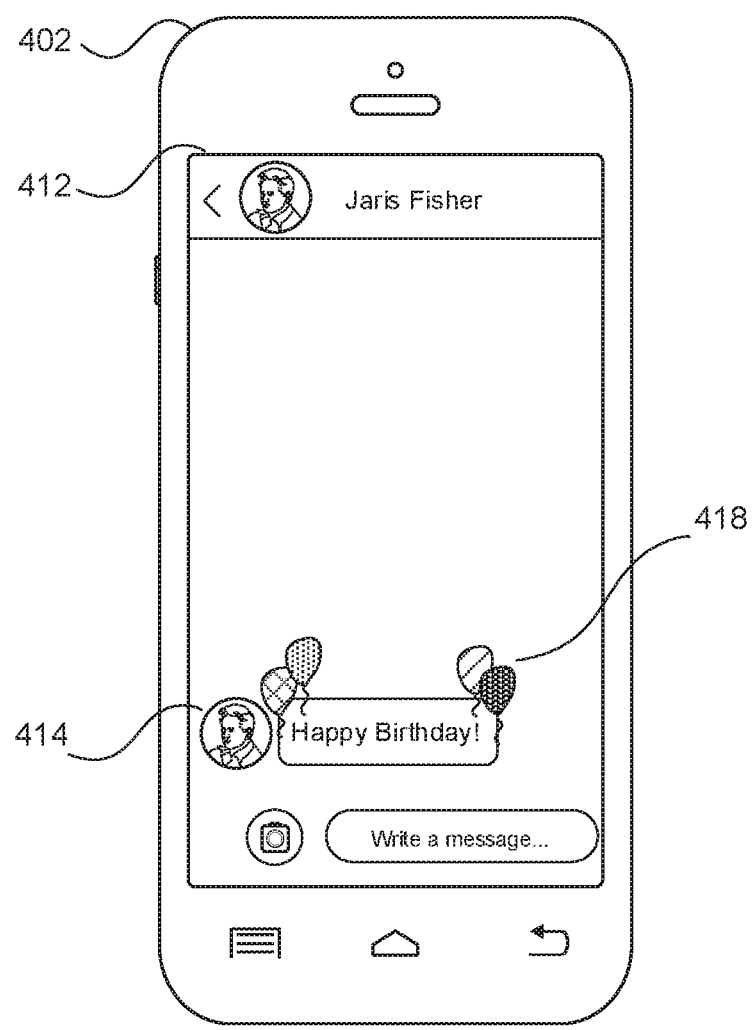

In the example of FIG. 4A, the messaging interface 404 provides access to a number of message threads 406 through which groups of users can exchange messages. In the example of FIG. 4A, the user operating the computing device can access a message thread 408, for example, using various touchscreen gestures. Once accessed, the messaging interface 404 can provide a message view 412 of the message thread 408 as illustrated in the example of FIG. 4B. In this example, the message view 412 includes a message 414 that was composed by a user. In some embodiments, options for visually augmenting the message 414 can be provided to the user as shown in the example of FIG. 4B. In this example, an option 416 for applying a graphical balloons overlay was selected. Options to select other overlays or animations (e.g., emojis, hearts, themes, etc.) also can be presented. As a result, a preview of a visually augmented version 418 of the message 414 is shown. The user can then confirm and send the visually augmented version 418 of the message 414 through the message thread 408, as shown in the example of FIG. 4C. As mentioned, there are myriad ways to visually augment messages (or message bubbles).

Figure 4D:
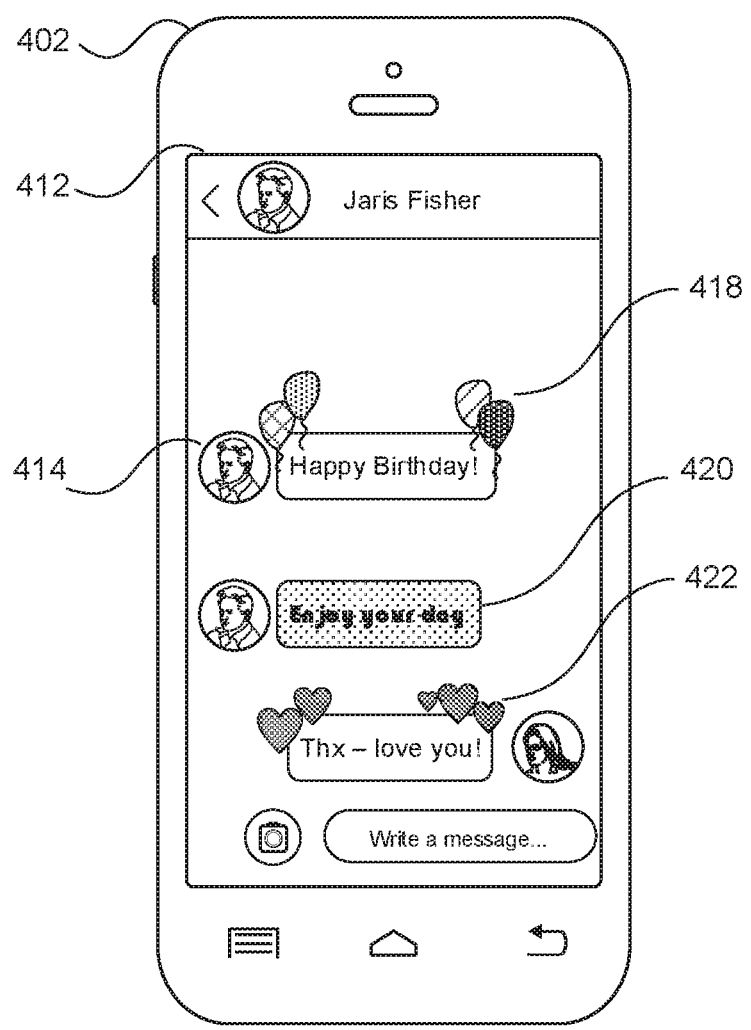

For example, FIG. 4D illustrates a message 420 for which a message bubble color and font has been modified. In some embodiments, visual augmentations can be applied to messages automatically. For example, in some embodiments, a message that satisfies predefined criteria can be visually modified using visual augmentations that are associated with the predefined criteria. For example, predefined criteria for a visual augmentation may be satisfied when a predefined term and/or phrase appears in a message. In the example of FIG. 4D, a visual hearts animation 422 was automatically applied to a message because the message includes a predefined term (e.g., "love").

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, at least one message to be sent through a message thread is determined. The message thread is used to exchange messages among users. At block 504, at least one visual augmentation to be applied to the at least one message is determined. At block 506, the at least one visual augmentation is applied to the at least one message. The at least one visually augmented message is sent through the message thread.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
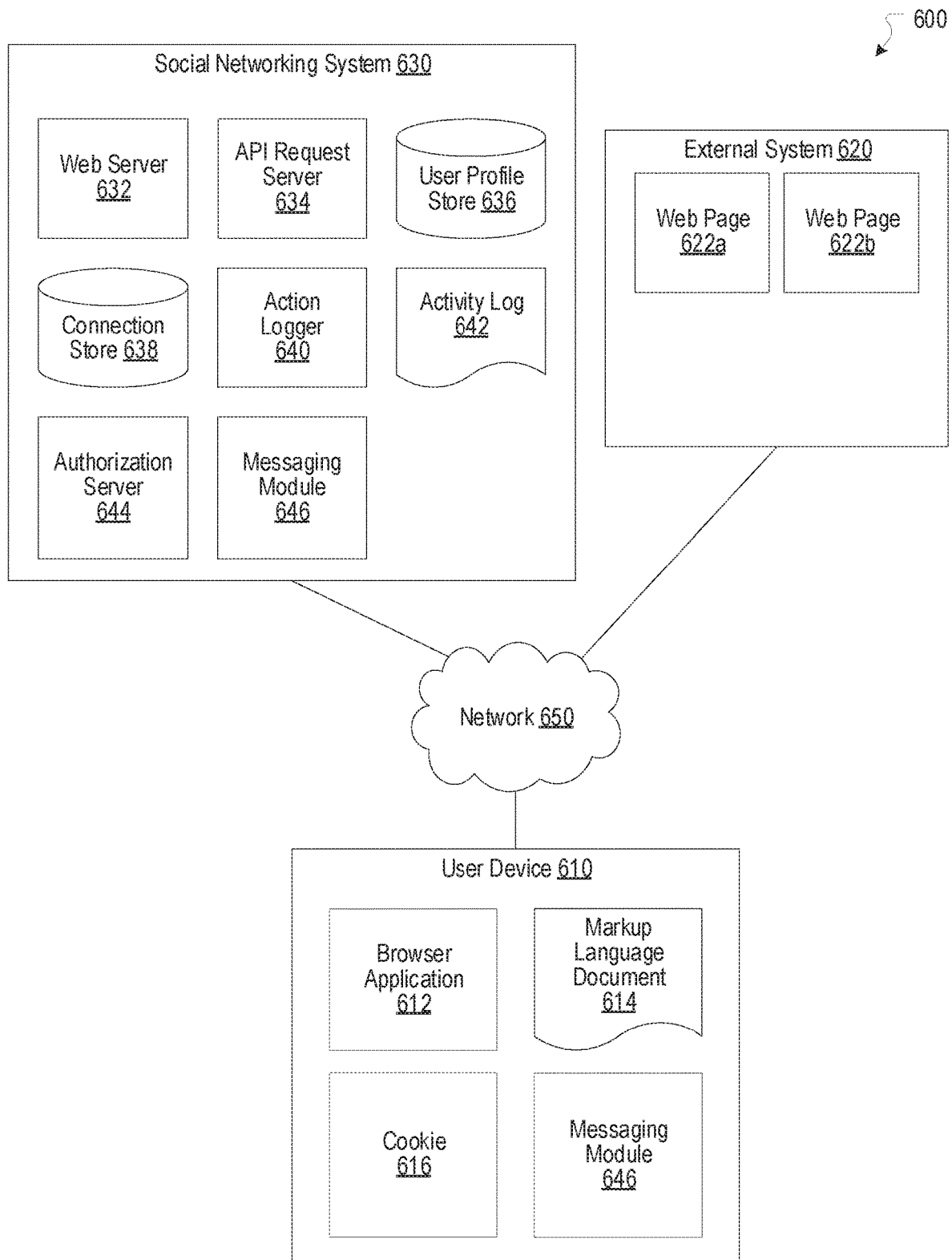
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system

620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a messaging module 646. The messaging module 646 can, for example, be implemented as the messaging module 102 of FIG. 1. In some embodiments, the messaging module 646, in whole or in part, is additionally or alternatively implemented in the user device 610. As discussed previously, it should be appreciated that there can be many variations or other possibilities.

Hardware Implementation

Figure 7:
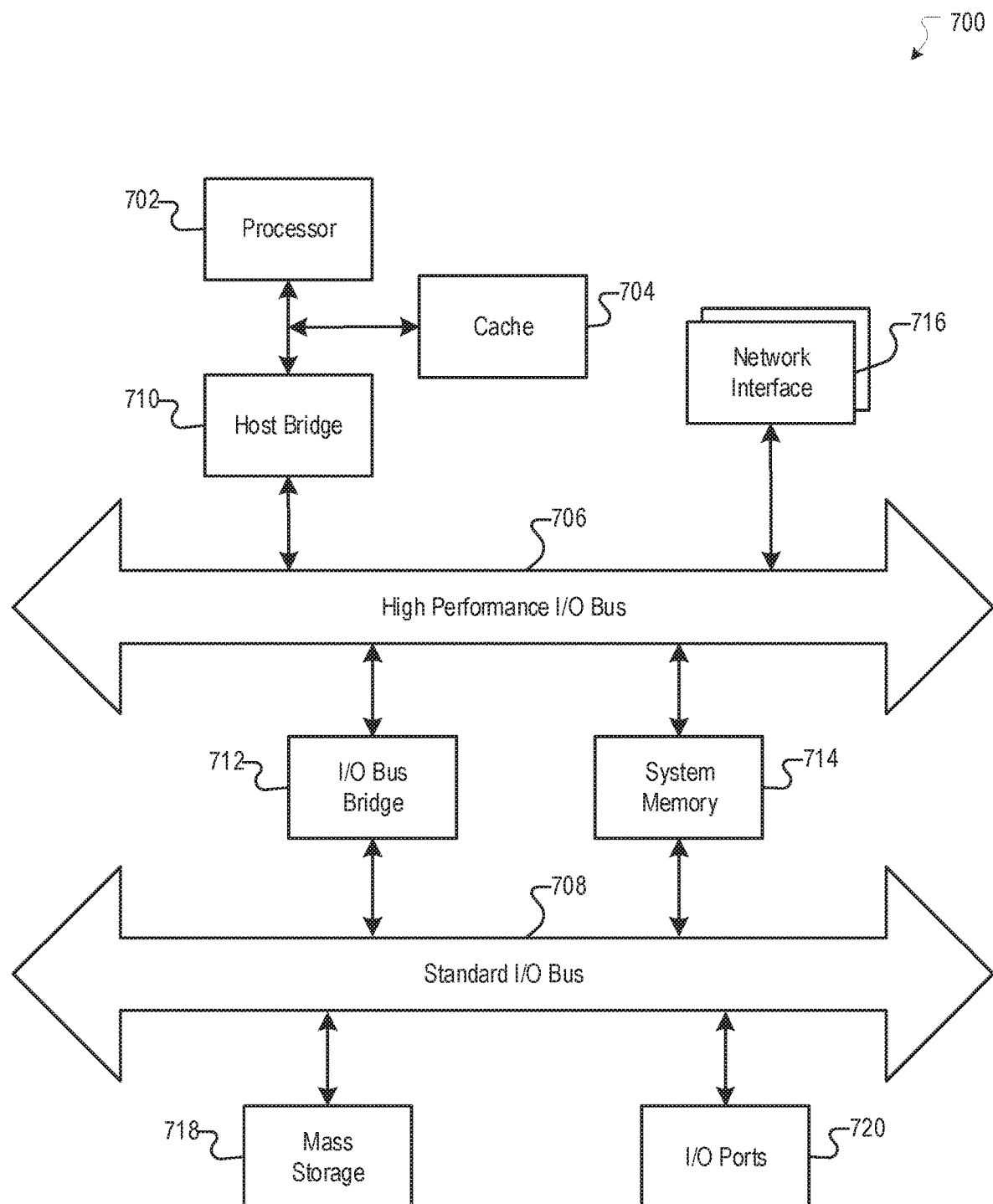
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, at least one message to be sent through a message thread, wherein the message thread is used to exchange messages among users;
   determining, by the computing system, at least one visual augmentation to be applied to the at least one message;
   applying, by the computing system, the at least one visual augmentation to the at least one message, wherein the at least one visually augmented message is sent through the message thread, wherein the at least one visual augmentation modifies an appearance of the at least one message using one or more graphical animations;
   providing, by the computing system, an option to reanimate the one or more graphical animations that modify the appearance of the at least one message within the message thread; and
   causing, by the computing system, the one or more graphical animations to be reanimated to modify the appearance of the at least one message within the message thread based on a selection of the option.

2. The computer-implemented method of claim 1, wherein the at least one visual augmentation modifies a color of a message bubble in which the message appears.

3. The computer-implemented method of claim 1, wherein the at least one visual augmentation modifies a font used to format the message.

4. The computer-implemented method of claim 1, wherein the at least one visual augmentation modifies an appearance of the at least one message using one or more graphical overlays.

5. The computer-implemented method of claim 1, wherein determining at least one visual augmentation to be applied to the at least one message further comprises:
   determining, by the computing system, that the at least one message satisfies predefined criteria for applying the at least one visual augmentation.

6. The computer-implemented method of claim 5, wherein the at least one visual augmentation is automatically applied to the at least one message when the predefined criteria is satisfied.

7. The computer-implemented method of claim 5, wherein the at least one visual augmentation is provided as a suggested visual augmentation for the at least one message when the predefined criteria is satisfied.

8. The computer-implemented method of claim 5, wherein the predefined criteria is satisfied when the at least one message includes one or more predefined terms and/or phrases.

9. The computer-implemented method of claim 1, wherein the at least one visually augmented message is sent through a social networking system.

10. A system comprising:
    at least one processor; and
    a memory storing instructions that, when executed by the at least one processor, cause the system to perform:
    determining at least one message to be sent through a message thread, wherein the message thread is used to exchange messages among users;
    determining at least one visual augmentation to be applied to the at least one message;
    applying the at least one visual augmentation to the at least one message, wherein the at least one visually augmented message is sent through the message thread, wherein the at least one visual augmentation modifies an appearance of the at least one message using one or more graphical animations;
    providing an option to reanimate the one or more graphical animations that modify the appearance of the at least one message within the message thread;
    causing the one or more graphical animations to be reanimated to modify the appearance of the at least one message within the message thread based on a selection of the option.

11. The system of claim 10, wherein the at least one visual augmentation modifies a color of a message bubble in which the message appears.

12. The system of claim 10, wherein the at least one visual augmentation modifies a font used to format the message.

13. The system of claim 10, wherein the at least one visual augmentation modifies an appearance of the at least one message using one or more graphical overlays.

14. A non-transitory computer-readable storage medium including instructions that, when executed by at least one processor of a computing system, cause the computing system to perform a method comprising:
    determining at least one message to be sent through a message thread, wherein the message thread is used to exchange messages among users;
    determining at least one visual augmentation to be applied to the at least one message; and applying the at least one visual augmentation to the at least one message, wherein the at least one visually augmented message is sent through the message thread, wherein the at least one visual augmentation modifies an appearance of the at least one message using one or more graphical animations;

providing an option to reanimate the one or more graphical animations that modify the appearance of the at least one message within the message thread; and causing the one or more graphical animations to be reanimated to modify the appearance of the at least one message within the message thread based on a selection of the option.

15. The non-transitory computer-readable storage medium of claim 14, wherein the at least one visual augmentation modifies a color of a message bubble in which the message appears.

16. The non-transitory computer-readable storage medium of claim 14, wherein the at least one visual augmentation modifies a font used to format the message.

17. The non-transitory computer-readable storage medium of claim 14, wherein the at least one visual augmentation modifies an appearance of the at least one message using one or more graphical overlays.

* * * * *